United States Patent
Nath et al.

(10) Patent No.: US 11,347,207 B2
(45) Date of Patent: May 31, 2022

(54) SYSTEM FOR OPERATOR MESSAGES WITH CONTEXTUAL DATA AND NAVIGATION

(71) Applicant: Honeywell International Inc., Morris Plains, NJ (US)

(72) Inventors: Rahul Chandra Nath, Sydney (AU); David Ross Nixon, Freshwater (AU); Graeme Laycock, Hunters Hill (AU)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 16/442,399

(22) Filed: Jun. 14, 2019

(65) Prior Publication Data
US 2020/0393817 A1 Dec. 17, 2020

(51) Int. Cl.
G05B 19/418 (2006.01)
G05B 23/02 (2006.01)

(52) U.S. Cl.
CPC ..... *G05B 19/4183* (2013.01); *G05B 19/4185* (2013.01); *G05B 19/41875* (2013.01); *G05B 23/0216* (2013.01)

(58) Field of Classification Search
CPC .......... G05B 19/4183; G05B 19/41875; G05B 23/0216; G05B 19/4185
See application file for complete search history.

(56) References Cited

U.S. PATENT DOCUMENTS

| | | | |
|---|---|---|---|
| 5,546,301 A | 8/1996 | Agrawal et al. | |
| 5,557,549 A * | 9/1996 | Chang | G05B 23/027 702/183 |
| 6,138,049 A | 10/2000 | McLaughlin | |
| 6,272,386 B1 | 8/2001 | McLaughlin et al. | |
| 7,313,448 B2 | 12/2007 | Dietrich et al. | |
| 7,630,777 B2 | 12/2009 | Rudnick et al. | |
| 8,826,165 B2 * | 9/2014 | Harrod | G05B 19/042 715/771 |
| 9,665,089 B2 | 5/2017 | Schreder et al. | |
| 2005/0203789 A1 * | 9/2005 | Kauffman | G06Q 10/20 705/80 |
| 2008/0079558 A1 * | 4/2008 | Dorgelo | G05B 19/406 340/506 |
| 2008/0079596 A1 * | 4/2008 | Baier | G05B 23/0235 340/679 |

(Continued)

FOREIGN PATENT DOCUMENTS

EP 1906289 A1 4/2008

OTHER PUBLICATIONS

EP Search Report for corresponding European Application No. 20178141.6 dated Nov. 6, 2020.

(Continued)

*Primary Examiner* — Charles R Kasenge
(74) *Attorney, Agent, or Firm* — Paschall & Associates, LLC; Anthony Miologos; James C. Paschall

(57) ABSTRACT

An industrial automation system that allows for communication between an operator and a processing unit, which includes contextual information, such as data, and retrieval of historical messages, for a processing unit when abnormal operational conditions are encountered, resulting in faster responses and more complete information to address the abnormal condition.

20 Claims, 2 Drawing Sheets

(56) References Cited

U.S. PATENT DOCUMENTS

| | | | |
|---|---|---|---|
| 2008/0167833 A1* | 7/2008 | Matsen | G01N 29/2481 |
| | | | 702/122 |
| 2009/0204232 A1* | 8/2009 | Guru | G06Q 10/06 |
| | | | 700/9 |
| 2010/0070907 A1* | 3/2010 | Harrod | G06F 8/34 |
| | | | 715/772 |
| 2011/0144776 A1 | 6/2011 | Hollender et al. | |
| 2013/0211559 A1* | 8/2013 | Lawson | G05B 19/41855 |
| | | | 700/83 |
| 2016/0112283 A1 | 4/2016 | Maturana et al. | |
| 2016/0132538 A1 | 5/2016 | Bliss et al. | |
| 2016/0182309 A1 | 6/2016 | Maturana et al. | |
| 2016/0334765 A1* | 11/2016 | Duca | G05B 19/4186 |
| 2016/0335858 A1* | 11/2016 | Burd | G06Q 10/06 |
| 2017/0019317 A1* | 1/2017 | Lawson | G05B 19/41855 |
| 2018/0052451 A1 | 2/2018 | Billi et al. | |
| 2018/0088566 A1 | 3/2018 | Billi-Duran et al. | |
| 2018/0259923 A1 | 9/2018 | De et al. | |
| 2019/0014180 A1* | 1/2019 | Lawson | G05B 19/41855 |
| 2019/0102059 A1 | 4/2019 | Strinden et al. | |

OTHER PUBLICATIONS

Examination Report for corresponding Australian Application No. 2020203326.

* cited by examiner

SYSTEM FOR OPERATOR MESSAGES WITH CONTEXTUAL DATA AND NAVIGATION

FIELD OF THE INVENTION

This invention relates generally to industrial process control and I automation systems. More specifically, this invention relates to an apparatus and method for providing expanded communication between an operator a record database and field technicians in an industrial process control and automation system.

BACKGROUND OF THE INVENTION

Processing facilities, or industrial plants, are typically managed using industrial automation systems. Example processing facilities include manufacturing plants, chemical plants, crude oil refineries, and ore processing plants. Among other things, industrial automation systems often manage the use of industrial equipment in the processing facilities.

Various process industries have seen constant growth in industrial automation technology. In particular, there is a need with modular unit processes for communication between a process unit in an industrial plant and other team members for a process unit. Typically, communication includes the use of cell phones or radios within an industrial plant.

However, it is often challenging to provide the necessary level of communication between operators of an industrial process with team members quickly when the team members are in distant locations.

SUMMARY OF THE INVENTION

The present invention provides for a rapid two-way communication between operators and other team members, as well providing operating information in the form of comments, contextual information and other explanatory messages to an operator of an abnormal operational condition or situation. In a first embodiment, the method records a message from a processing unit upon receiving a signal from one or more sensors. The processing unit includes a processor with memory for storing the signal, and recording the signal in the memory. The processor includes memory for storing of a program to run the processing unit, and includes control information on operational limits for the signal. The processor generates a message when the signal received from the sensor is outside the operational limits for the program. The method includes sending the generated message to an operator station, and prompts the operator for a response. The generated message can send a link to a menu of possible preprogrammed responses for the operator to choose from, or can allow the operator to input a response. The operator's response is recorded for future reference. The method allows for input of signal data, generated graphs, comments and additional information that is stored, and available to other operators.

In another embodiment, the invention comprises an addition to a distributed control system for recording and transmitting messages to operators and recording and transmitting responses from the operators when a processing unit encounters an abnormal condition or situation. The apparatus includes a sensor that generates a processing signal, indicating a processing condition such as temperature for example. The apparatus further includes a processor that includes memory for storing a control program to operate a processing unit, wherein the processor includes storage for storing the signals and creates a signal record. The control program, also known as a recipe, includes processing limits, and generates a message when the process signal exceeds the limits. The generated message includes information regarding the process, the recipe, and the type of signal generated by the sensor. The apparatus includes a communication device for sending the message to the operator and receiving a response from the operator. The communications can include a signal stream of data and output the information in the form of a graph, or other convenient means of displaying the results.

Additional objects, embodiments and details of this invention can be obtained from the following drawing and detailed description of the invention.

DETAILED DESCRIPTION

Communication is important in today's industrial processing plants. There is a need for a rapid transfer of information and a record to draw upon information for similar circumstances in the past to continually provide greater responsiveness in the operation of industrial processes. Currently, industrial plants rely on phone communications, or other electronic communications for disclosing abnormal operational conditions. There is a need for improving these communications and providing for more information and more secure communications. This improvement reduces losses due to lost product or downtime.

The present invention provides for more instant communication, as well as providing more complete information to a process controller, or to an operator to provide solutions to situations encountered.

Figure 1:
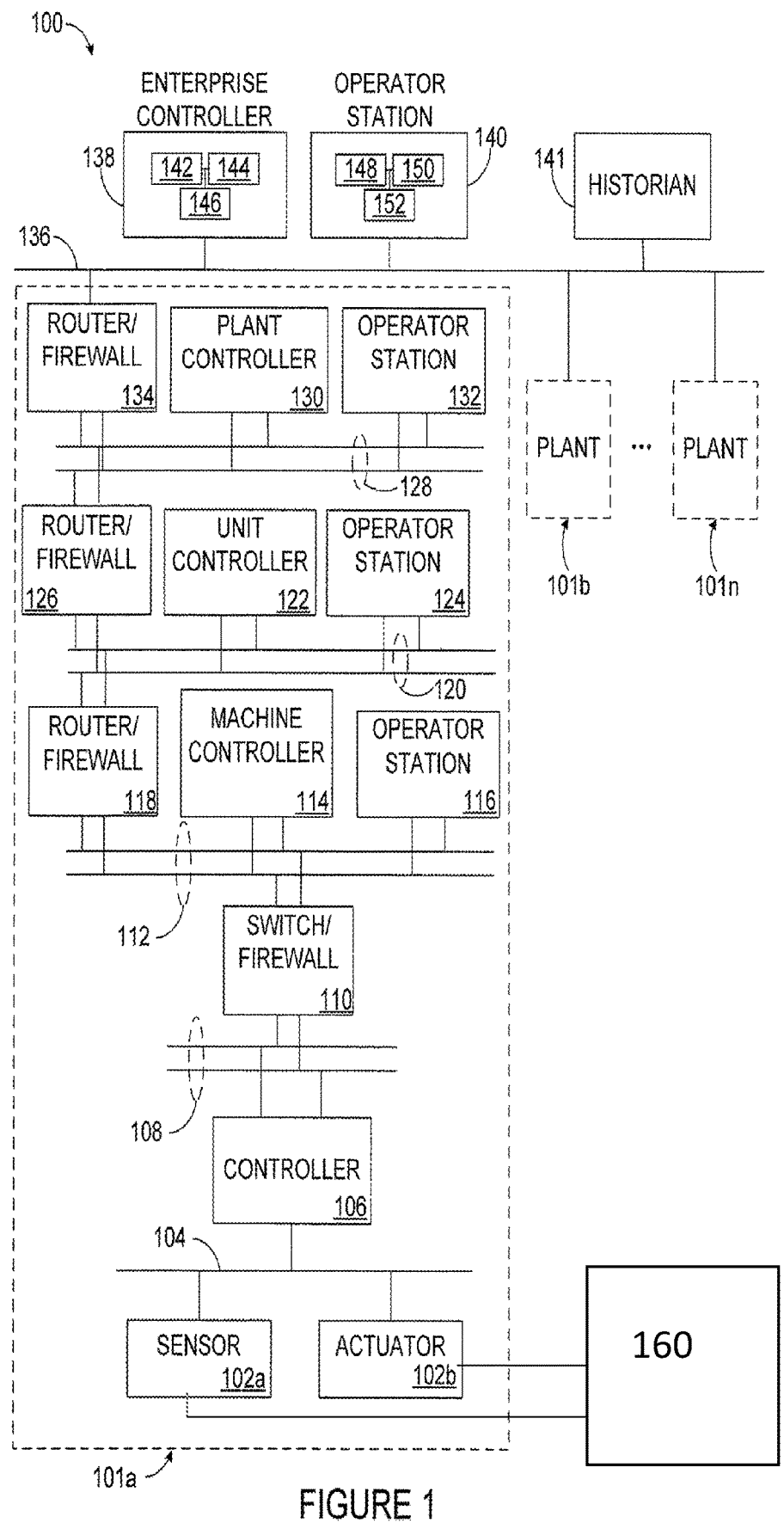
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine), or processing unit 160. For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100, For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

An important aspect of the invention is the communication between an automation system operator at an operator station 116, and a field service person. The field service person is someone who is on site checking the routine operation of process units. The operator, while at the plant, or even at a distant location, is at an operations center monitoring information coming in from the process units. Should an abnormal condition arise, the rapid communication between the operator and the field service person is important for reducing downtime and bringing a process back into normal operational conditions.

By capturing operational signals, indicating an abnormal condition, the operator can send a copy of the signal, and supporting information to the field service person, as well as messages, indicating a source of the problem, enabling the field service person to bring the process back to normal operational conditions.

Likewise, a field service person, can transmit photos, or other information to the operator, who can evaluate the information from the field service person, against the messages that have been saved from prior abnormal conditions.

In addition, this invention provides important communication wherein the operator can inform the field service person of an abnormal condition, and can send signal data, or other information. The field service person can check, not only to see if there is a change in the process unit's operation, but check to see if there is a faulty signal due to a failed sensor, or a signal change due to a failed actuator, or other faulty device.

Figure 2:
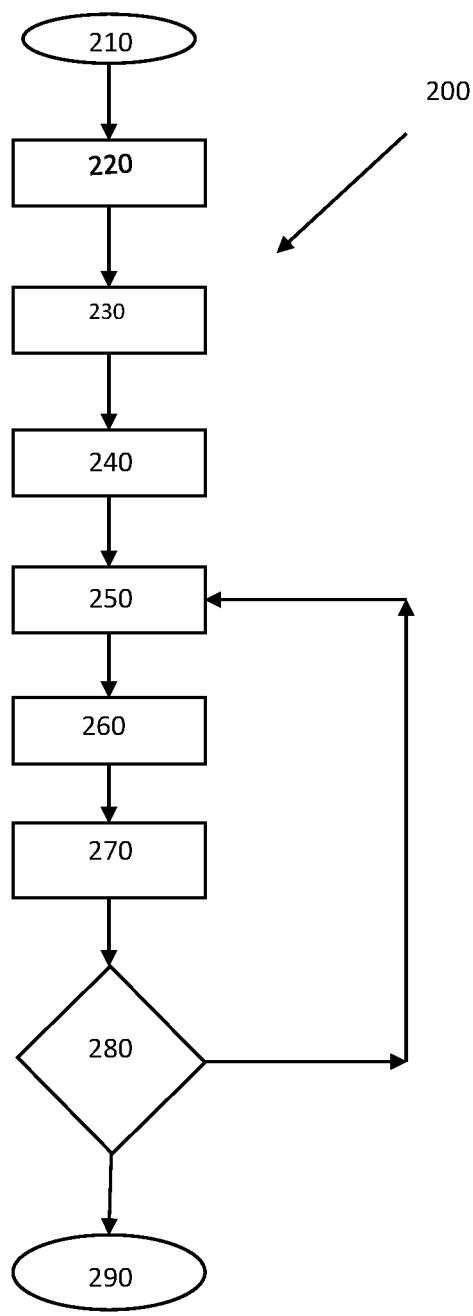
FIG. 2 shows a flow chart of the process.

In the present invention, an operating unit includes sensors and actuators, with information flowing from the sensors to a controller, and the controller sends a response to an actuator for the process. The present invention provides for a rapid response when the controller receives an abnormal condition. As presented in FIG. 2, the process 200 is shown. A process 210 is monitored by an operator. The process has sensors that generate signals indicating the operating conditions of the processing unit 160. A processing unit 160 is any operational unit in a plant that produces a product, or used to produce an intermediate step in the production of the product, and is monitored by sensors attached to the processing unit 160, and has actuators for modifying the conditions in the processing unit 160. Examples include chemical reactors, separation units, or an intermediate step in the production such as a process that fills bottles or cans. The signals are received by a processor, wherein the signals from the sensor on the processing unit 160 are stored in memory that is included with the processor, or controller 106, associated with the processing unit 160. The processor also includes memory for storing a control program for operating the processing unit 160. The control recipe is a program designed for operating the processing unit 160. The control recipe includes operational limits for the signal. When the processor detects an abnormal condition 220, or a signal that is outside the operational limits, the system generates a message 230 indicating the signal is abnormal, or outside the operational limits as specified by the recipe. The generated message can be sent to the display for the operating unit. The message can generate a prompt for the operator to respond to the message. The generated message includes information regarding the process, the control recipe and the type of signal generated by the sensor. The operator then selects a response to the message 240.

The message can be a preprogrammed response the operator enters, or selects from a menu, or allows the system to select a default response. The menu presents a list of options 250, based upon the type of processing unit 160 and the sensor 102a. The options are ranked by relevance, severity, historical actions, or some combination with appropriate weighting of the abnormal condition to provide guidance to the operator. The menu is generated from past operating conditions for the process, when the process has registered as deviating from the limits set in the process recipe. This provides an operator with a quick listing and of causes of the current abnormal condition. The relevance is based upon severity of the signal, and the frequency with which a similar signal has been received in the past. For example for a heated mixer, the message might be "mixer heat out of limit", or "temperature out of mixer temperature range", or "pressure out of pressure range". The operator can add text, images, process data, emojis and other information to the operator's response message, and then completes the transmission of the message and storage of the message. The interaction includes a link to a control action, which can be a preprogrammed action, or an operator input action.

In selecting a message from the menu, the operator can "like" or "dislike" a message 260, which will update the "like" or "dislike" count for that message. The updating of the "like" or "dislike" count for a message allows for operators to study the frequency of abnormal behaviors and to assess which messages are most likely. The operator then sends the response 270 and performs the recommended action. The system checks to see that the process has returned to normal operating conditions 280. A response time is built into the cycle to allow the process unit to return to normal operating conditions. If the process has not returned to normal operating conditions, the system returns to the list of options 250 and continues allowing the operator to review other relevant options from the menu. Normal operating conditions are when the signal returns to the range prescribed by the recipe. The operator can rapidly communicate to a field service person to check on progress and make recommendations. This system of checking continues until the process returns to normal 290.

The present invention is a method for recording messages in a processing unit 160, that includes receiving a signal from a sensor on the processing unit 160 with a processor. The processor includes memory for storing the signal and recording the signal in memory on the processor. The method generates a message, or generated message, when the signal is outside preselected limits, and includes recording the generated message. The method can further include sending the generated message to a display for the processing unit 160. The display can be located in a control room, or on a portable device programmed to receive information from the processor. The display includes information about the process, and control recipe and the type of signal generated by the sensor. The method includes generating a prompt for the operator, or for a field service person to respond to the message.

In another embodiment, the method includes transmitting the message to a central data center that is in communication with the processor. The message can include priority flags to include further communication with other recipients. Other recipients can include a central control center, or a supervisory control center, wherein the supervisory control center generates a confirmation message to a local operator for the processing unit 160. The confirmation message can be transmitted to a supervisory operator for control as a check to verify that the message has been received.

In one embodiment, the method includes the processing unit 160 in communication with a central data center and further comprising transmitting the generated message to the central data center. The central data center can be the historian 141, for keeping records of abnormal conditions, or records of the process signals. The central data center, or historian 141, can be on cloud storage. By integrating these messages into a central data center, other plants can have access to compare when abnormal conditions arise. The operator's response message is also transmitted to the central data center, to allow other operators to see what has been done.

In another embodiment, the processor in the processing unit 160 is in communication with a supervisory control center and further includes transmitting the generated message to the supervisory control center. The supervisory control center can be the plant controller 130, or can be the enterprise controller 138. This enables communication of events to other plants, or other processing units within the plant to allow similar problems to be addressed quickly. The supervisory control center can generate a confirmation message to the local operator for the processing unit 160. This allows operators to know of additional resources. The supervisory control center can also generate a second message and transmits the second message to a supervisory operator, to insure the abnormal operating condition is being addressed.

In another embodiment, the invention comprises an apparatus for recording an abnormal behavior in a process, and generating a message about the abnormal behavior. The apparatus includes a sensor 122 on a processing unit 160 that generates a signal. The apparatus includes a processor, or controller 106, which includes memory for storing a control recipe, wherein the control recipe is associated with running a process for producing a product, and wherein the processor includes memory for storing the signals received from the sensor, creating a signal record. The product can be an intermediate product for use in a final product. The control recipe includes processing limits, and generates a process message when the process exceeds the limits, and wherein the process message includes information regarding the process, the control recipe and the type of signal generated by the sensor. The apparatus further includes a means for inputting a response message to the process message, and means for capturing the response message. The response message can be an automated response selected from a menu of potential responses for returning the process unit to a normal operating condition. The menu also allows for an operator, or a field service person to put in a response message in free form. The apparatus further includes a human interface component. The human interface component can be a mobile device, or can be a computer terminal located at the operator station 116.

In one embodiment, the apparatus includes a central database, or central library, wherein the signal record is transmitted and stored in the central database. The central database can be a database local to the plant, or can be the historian 141 for recording process information.

In another embodiment, the apparatus includes a means for inputting photos, message text, graphs, and process data. The process data can be collected and graphed at the operator station 132. The operator station 132 can include scanners and monitors with keyboards for inputting message text, or microphones with software for converting speech to text.

In another embodiment, the apparatus includes a search function located in memory on the processor. The search function can recover stored messages from either a local data center, or the historian 141, for stored messages that have the same information regarding the process, the control recipe and the type of signal generated by the sensor. The search function can include operator input to alter the parameters of the search for stored messages.

In yet another embodiment, the apparatus can further be a part of a distributed control system, wherein the distributed control system includes a supervisory control center, or plant controller 130, or enterprise controller 138. The supervisory control center is in communication with the operator station 124 and the processor, or unit controller 122, and is in communication with the central data center, or historian 141. This provides for oversight control and distribution of messages to similar processing units.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for an automation system that allows for communication between an operator station of the automation system and a communication interface located in a remote location, comprising:
   a sensor that generates signals responsive to an operation process of the automation system;
   a processor connected to a memory, the memory storing the signals received from the sensor and creating a signal record;
   a control program including operational limits for the signals received from the sensor stored in the memory and used by the processor, to access the signal record generated by the sensor, to generate a process message based on a condition of the signal, wherein the process message includes a list of options based upon a type of the sensor and on past operating conditions of the automation system generated when the automation system has registered as deviating from the operational limits set in the operation process;
   an operator station interface connected to the processor and memory, the operator station interface retrieving the process message, arranged to add contextual information to the process message;
   a communication network connected to the processor arranged to send the process message and contextual information to the communication interface and to receive response messages from the communication interface; and
   the processor configured to:
   capture the response message;
   verify the operation process of the automation system based on the response message and the process message and to further provide the list of options to the communication interface;
   whereby, the processor is arranged to capture the response messages from the communication interface and store it in the memory.

2. The apparatus of claim 1 further comprising a human interface component for inputting the response message.

3. The apparatus of claim 2 wherein the communication interface can be a mobile device, or a computer terminal operating in a remote location.

4. The apparatus of claim 1 wherein the automation system includes a distributed control system wherein the distributed control system includes a supervisory control center and a central data center with communication between the processor and the central data center, and with communication between the processor and the supervisory control center.

5. The apparatus of claim 4 wherein the signal record is transmitted to a central database.

6. The apparatus of claim 5 wherein the central database is stored in a cloud.

7. The apparatus of claim 4 wherein a central database is stored in a central data center.

8. The apparatus of claim 1 further comprising capturing a signal stream and transmitting the signal stream with the process message.

9. The apparatus of claim 1 further comprising means for inputting photos, message text, graphs, and process data.

10. The apparatus of claim 1 further comprising means for inputting photos, emojis, text with the response message.

11. The apparatus of claim 1 further comprising memory on the processor for storing a control recipe, wherein the control recipe is associated with running the operation process for producing a product, and wherein the control recipe includes processing limits.

12. A method for recording messages in a processing unit of an automation system, comprising:
   receiving a signal related to an operation process from a sensor on the processing unit with an processor, wherein the processor includes memory for storing the signal and for creating a signal record;

recording the signal in the memory of the processor, wherein the processor includes memory for storing a control recipe to access the signal record, and wherein the control recipe includes operational limits for the signal;

generating a process message based on a condition of the signal indicating that the signal received from the sensor is outside the operational limits for the control recipe, wherein the process message includes a list of options based upon a type of the sensor and on past operating conditions of the automation system generated when the automation system has registered as deviating from the operational limits set in the operation process;

retrieving, via an operator station interface connected to the processor and the memory, the process message, and adding contextual information to the process message;

receiving the generated process message and the contextual information, via a communication network connected to the processor and recording a response message; and capturing the response message from the communication network and storing the response message in the memory; and verifying the operation process of the automation system based on the response message and the process message and to further provide the list of options to a communication interface.

13. The method of claim 12 further comprising sending the generated process message to a display for the processing unit.

14. The method of claim 13 further comprising generating a prompt for the operator to respond to the generated process message.

15. The method of claim 14 wherein the prompt for the operator includes a menu of selected responses for the operator to choose from.

16. The method of claim 12 wherein the generated process message includes information regarding the operation process, the control recipe and the type of signal generated by the sensor.

17. The method of claim 12 wherein the processor associated with the processing unit is in communication with a central data center and further comprising transmitting the generated process message to the central data center.

18. The method of claim 12 wherein the processor associated with the processing unit is in communication with a supervisory control center and further comprising transmitting the generated process message to the supervisory control center.

19. The method of claim 18 wherein the supervisory control center generates a confirmation message to a local operator for the processing unit.

20. The method of claim 19 wherein the supervisory control center generates a second message and transmits the second message to a supervisory operator.

* * * * *